(12) United States Patent
Hofer et al.

(10) Patent No.: US 9,672,810 B2
(45) Date of Patent: Jun. 6, 2017

(54) OPTIMIZATIONS TO DECODING OF WFST MODELS FOR AUTOMATIC SPEECH RECOGNITION

(71) Applicant: Intel Corporation, Santa Clara, CA (US)

(72) Inventors: Joachim Hofer, Munich (DE); Georg Stemmer, Munich (DE)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 14/499,049

(22) Filed: Sep. 26, 2014

(65) Prior Publication Data

US 2016/0093292 A1   Mar. 31, 2016

(51) Int. Cl.
*G10L 15/06* (2013.01)
*G10L 15/02* (2006.01)
*G10L 15/14* (2006.01)

(52) U.S. Cl.
CPC ............ *G10L 15/02* (2013.01); *G10L 15/142* (2013.01); *G10L 2015/025* (2013.01); *G10L 2015/0635* (2013.01)

(58) Field of Classification Search
CPC .............................. G06F 17/2775; G10L 15/06
USPC ........................................................ 704/240
See application file for complete search history.

(56) References Cited

U.S. PATENT DOCUMENTS

| 6,243,679 | B1 * | 6/2001 | Mohri | G10L 15/193 704/10 |
| 7,743,011 | B2 * | 6/2010 | Beesley | G06F 17/273 704/232 |
| 7,797,148 | B2 * | 9/2010 | Chen | G06F 17/2818 704/238 |
| 7,860,719 | B2 * | 12/2010 | Maskey | G06F 17/2775 704/257 |
| 8,229,731 | B2 * | 7/2012 | Chen | G06F 17/2818 704/2 |
| 8,484,154 | B2 * | 7/2013 | You | G10L 15/34 706/52 |
| 8,788,258 | B1 * | 7/2014 | Bangalore | G11B 27/105 704/2 |
| 8,972,243 | B1 * | 3/2015 | Strom | G10L 15/193 704/1 |
| 9,093,061 | B1 * | 7/2015 | Secker-Walker | G10L 15/083 |
| 9,099,082 | B2 * | 8/2015 | Kim | G10L 15/04 |
| 9,275,039 | B2 * | 3/2016 | Nagao | G06F 17/2775 |
| 9,390,712 | B2 * | 7/2016 | Yu | G10L 15/16 |
| 9,530,404 | B2 * | 12/2016 | Hofer | G10L 15/083 |

* cited by examiner

*Primary Examiner* — Susan McFadden
(74) *Attorney, Agent, or Firm* — Nicholson De Vos Webster & Elliott, LLP

(57) ABSTRACT

A method in a computing device for decoding a weighted finite state transducer (WFST) for automatic speech recognition is described. The method includes sorting a set of one or more WFST arcs based on their arc weight in ascending order. The method further includes iterating through each arc in the sorted set of arcs according to the ascending order until the score of the generated token corresponding to an arc exceeds a score threshold. The method further includes discarding any remaining arcs in the set of arcs that have yet to be considered.

8 Claims, 10 Drawing Sheets

OPTIMIZATIONS TO DECODING OF WFST MODELS FOR AUTOMATIC SPEECH RECOGNITION

FIELD

Embodiments of the invention relate to the field of automatic speech recognition; and more specifically, to optimizations to decoding of weighted finite state transducer (WFST) models for automatic speech recognition.

BACKGROUND

Automatic speech recognition (ASR) is the process of recognizing spoken language and translating the spoken language into the corresponding text. Typically a weighted finite state transducer (WFST) based model is used to translate the input audio to an output text. A finite state transducer is a finite state machine (FSM) that accepts an input label on a transition/arc and can also output an output label on the same arc. A weighted finite state transducer further adds a weighted score to each transition/arc. Such a WFST is able to translate various input labels into output labels according to the rules set within its states and transitions. Thus, this WFST takes as input acoustic units of the speech (like phonemes or HMM states) and outputs as text the text of this speech.

The WFST model for ASR is typically split into various components that model the various intermediate steps needed to translate the spoken audio. An acoustic model is usually used to translate the spoken audio into phones, a lexical model is used to convert phones to words, and a language model is used to combine these words into sentences. A phone represents a small acoustic component of spoken text that represents one of the standard sounds of a language (e.g., the word "want" may be represented by the phones "w ao n t"). As the system only knows the audio observations of the spoken audio, it cannot know with absolute certainty the phones that correspond to these audio features. Instead, the system attempts to find the most likely text given the audio observations of the speech. Such a model, which attempts to predict the most likely states that generate the observations, is typically based on Hidden Markov Models (HMMs).

An HMM is a FSM with state transition probabilities and emissive (or observation) probabilities. A state transition probability of one state to another state represents the probability of transition from the one state to the other. An emissive probability for an observation is the probability that a state will "emit," or generate, a particular observation. These probability values may be discovered for a particular system by a training process that uses training data. This training data includes observations along with the known states that generated these observations. After training, a decoding process, using a set of new observations, may traverse through the HMM to discover the most likely set of states that generated these observations. For example, after an HMM modeling the acoustic features to phones of a language has been trained, a decoding process may be used on a new set of audio (i.e., spoken words/sounds) to discover the most likely states and transitions that generated these observations. These states and transitions are associated with various phones in the language. If using a WFST, the input labels of this HMM WFST would be the acoustic features (the observations) the output labels would be the phones, and the weights of each transition would be the state transition probabilities.

Although there may not be a large number of phones in a particular language (e.g., English is typically modeled with 40 phones), human speech patterns can vary greatly based on context, intonation, prosody, etc. Thus, in order to model speech more accurately, the model will typically account for these various factors. For example, HMMs in ASR typically model the phone in the context of its surrounding phones (e.g. a tri-phone model) as the pronunciation of a phone may differ based on the context that it is in. Furthermore, each phone is typically modeled with a beginning, middle, and end state. Thus, the number of states needed to model a complete set of phones in a language can easily reach into the thousands.

Furthermore, the WFST modeling the audio features to phones is also combined with the WFST models that determine the most likely words given the a set of potential phones (lexical model), and the most likely sentences given a set of potential words (language model). These WFSTs are also trained using various data sets as well (e.g. a pronunciation dictionary, a language corpus).

This composition of these component WFSTs creates a very large WFST that has acoustic features as inputs and text as output. Such a WFST may easily include hundreds of thousands of states, and finding the most likely path within such a WFST in order to discover the most likely sequence of words given an audio sequence can easily become very computationally expensive.

Many methods are used to optimize this expensive process of finding the most likely path in the WFST given the observations. For example, instead of a brute force search, a method known as Viterbi decoding, using the Viterbi algorithm, is used to determine the most likely path in the WFST. The Viterbi algorithm traverses through the WFST, and for each observation (i.e. iteration), it calculates the probability of each transition/arc originating from an old state to new states given the observation (i.e., P(old state) ·P(transition from old to new state)·P(observation|new state), where P(old state) is the accumulated probability score of the path taken as calculated in the previous iteration; some systems may use the log of these values, which simplifies multiplicative operations to additive). As used here, old and new states refer to the states the algorithm is considering during one iteration of the algorithm, and not the actual states in the FSM (i.e., an old and new state could be the same state). After the algorithm computes the scores for each transition from all old states, for each new state, the algorithm selects the path from any old state that has the best score. These steps are repeated until all the observations are processed. At this point, the path with the best final accumulated scored is the most likely path given the observations, and the output labels along this path are the set of most likely output labels given the observations made.

However, although plain Viterbi decoding provides an improvement to brute force searching, given the very large WFST needed to model a language, Viterbi decoding is still computationally expensive, especially for low power devices.

Thus, further optimizations can be made. For example, one such optimization is beam pruning. Beam pruning shrinks the search space by discarding those paths in the current iteration that are worse than the best score by a significantly large threshold value. Using beam pruning, the decoding process does not need to traverse those paths with current scores that are unlikely to eventually yield the path with the best score. However, in order to find the best score, the beam pruning method must first find the best score of all the arcs in the current iteration before being able to then discard those paths that are worse than the best score by a threshold value. This requires that the "candidate" paths and their scores be stored before potentially being discarded.

Another optimization is to compose or combine the different parts of the entire WFST model dynamically during the decoding process. When combined statically, states in a "left" WFST are joined to states in a "right" WFST using transitions or arcs according to FSM composition rules. The "left" WFST outputs symbols that correspond to the input labels of the "right" WFST. Thus, the composition creates a unified WFST that may translate between the input labels of the "left" WFST, and arrive at the output labels of the "right" WFST. However, this composition has the potential of creating a composed WFST that is very large. Instead, dynamic composition allows for the "right" WFST to be joined to the "left" WFST after the "left" WFST has been decoded. This may save a significant amount of space.

However, this creates additional computational complexity as the searching of arcs in the "right" WFST must be done on the fly. To improve the speed of this operation, this search is facilitated with the use of an arc cache, which caches mappings of states and input labels to arcs. For example, the input label at a state ID of 2 may be "3". Upon a hit in the arc cache for this state and input label, the system may determine that the corresponding arc ID is 4 (i.e., from state 2, arc 4 accepts the input label "3"). Thus, instead of searching through the "right" WFST repeatedly, the system may simply consult the arc cache.

However, WFSTs may include "epsilon" arcs, typically to model backoff, which is a method of estimating a score for those inputs that are not modeled or available in the WFST. These are arcs do not accept an input label (they accept an "epsilon"), and must immediately be followed. Due to these epsilon arcs, the cache will not return a result for a state and input label, although the input label may appear after the epsilon arc.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
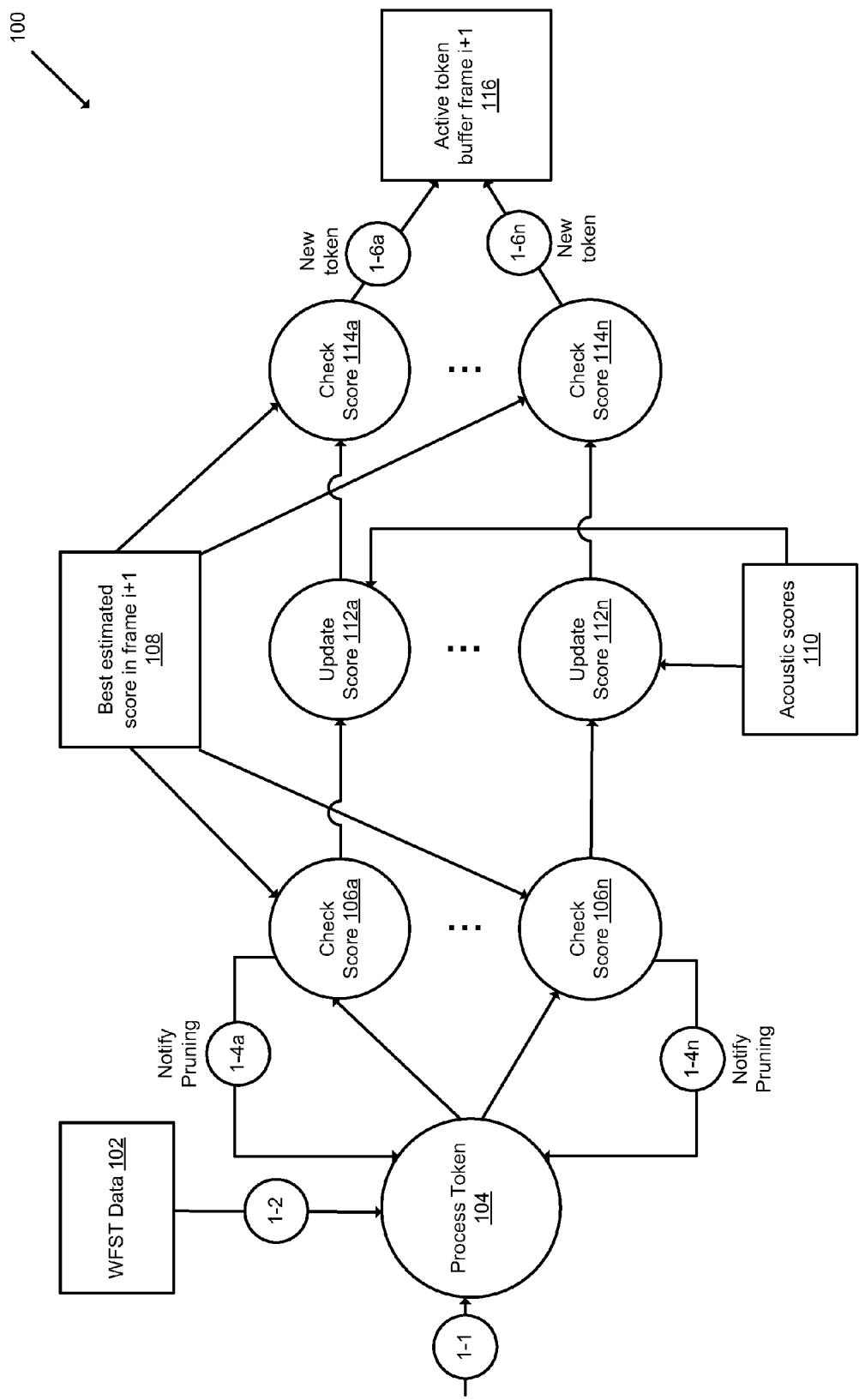
FIG. 1 illustrates one embodiment of a method 100 for beam pruning optimizations to decoding of weighted finite state transducer (WFST) models for automatic speech recognition.

The following description describes methods and apparatus for optimizations to decoding of weighted finite state transducer (WFST) models for automatic speech recognition. In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with an embodiment whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Automatic speech recognition (ASR) often uses WFSTs for decoding. One of the most computationally expensive tasks in the decoding process is Viterbi decoding, which is a time-synchronous search of the best hypothesis. This task requires a long processing time and consumes a large amount of power. One method of reducing the complexity is to utilize beam pruning. Beam pruning shrinks the search space by discarding tokens whose score in the previous frame (i.e., iteration of the Viterbi decoding algorithm) was significantly worse than the best score. A token represents a path through the WFST. For ASR, the path with the best score after decoding is the path that includes the most likely states (and output labels) that generated the observations that were made.

According to some embodiments of the invention, the computational complexity is further reduced significantly by discarding batches of tokens at once instead of individually. This reduces decoding time and power consumption. According to some embodiments, this is achieved by sorting the arcs of a state in a WFST based on the arc weight. While updating an active token, the score of each new token may be computed using the weight of the arc but ignoring the actual acoustic score. In some embodiments, the acoustic score is the emission probability of the observation being made. If this score is worse than an estimated best overall score by a significant amount, that token and all tokens of the following arcs in that state of the WFST are discarded. Further details regarding these embodiments will be described with reference to FIG. 1 and FIG. 2.

Automatic speech recognition (ASR) often uses WFSTs with dynamic composition using two WFSTs for decoding. A time and power consuming task is to search arcs in the second, "right" WFST that correspond to a state and an input label. With a naive search, ASR may not be achieved in real time on current processors or hardware accelerators. However, as the same (state, input label) searches are repeated often, a common way to solve this problem is to build a cache that stores (state, input label) to arc mappings.

According to some embodiments, the arc cache is further improved by not only saving arcs from the requested state, but also storing arcs that are recursively reachable from the state by means of epsilon arcs. Epsilon arcs do not accept a defined input label but may have a weight and need to be followed regardless of the current input label. This improved arc cache stores mappings of (state, input label) to (arc, accumulated (epsilon) weights). Further details regarding these embodiments will be described with reference to FIGS. 3a, 3b, and 3c.

FIG. 1 illustrates one embodiment of a method 100 for beam pruning optimizations to decoding of weighted finite state transducer (WFST) models for automatic speech recognition. The rectangular blocks in method 100 represent data stores. For example, block 102 represents WFST data, such as arc weights. The circular blocks represent steps in the method. The steps are marked with numerical indicators for ease of reference, however, these numbers do not necessarily indicate an order of operations for the method and the method may be performed with any order or combination of the steps.

The WFST data in block 102 includes the arc weights of the arcs in the WFST HMM model for ASR. In some embodiments, multiple states are used to model the acoustic components of a phone in the language being modeled. The arc weights for these states may represent their state transition probabilities. These state transition probabilities may correspond to the state occupation probability, i.e., the probability of being at that state at a certain time.

At circle 1-1, one or more tokens are received at circle 104 for processing. In some embodiments, for each state that is being processed, a token is generated for each outgoing arc from that state, and these tokens are processed. In such an embodiment, the token represents a path through the WFST that is one hypothesis of what was spoken, although not necessarily the best hypothesis. Each token includes a cumulative score that may include the probability of the path represented by the token given the speech observations. After processing an utterance or section of speech, the token that remains and has the best score is the token that represents the path through the WFST with the most likely hypothesis of what was spoken.

At 1-2, WFST data from block 102 for the tokens passed at 1-1 are also received at circle 104 for processing. At 104 for each token received at 1-1 and each arc received at 1-2 a token is generated for the next frame.

In some embodiments, the arcs of the WFST are sorted by weight. Thus, the tokens are implicitly sorted by their cumulative score as calculated from the previous frame, plus the weight of the arc that is considered, plus the best acoustic score of the current frame. In some embodiments, the tokens are sorted in an ascending order. As used here, a frame is an iteration in the method. At each iteration, the method 100 may generate new tokens and discard or keep them for the next iteration. The acoustic score is a score given to the observed unit of speech being analyzed. In some embodiments, the acoustic score corresponds to the emission probabilities of the HMM used to model the speech. The emission probabilities indicate the probability of a certain observation at a particular state. These emission probabilities may be based on Gaussian mixture models or on neural network models. In such an embodiment, the best acoustic score is known for a particular state as all the emission probabilities for a state are known based on the training data.

Starting with the WFST arc with the smallest weight, a token is processed along all the state's arcs individually. This is represented in method 100 by the duplication of various steps, such as the steps represented by circles 106a-106n, 112a-112n, etc. This is meant to indicate that these steps may be repeated for one or more of the sorted arcs.

At circle 106 (a-n), the score of each token generated by propagating along the corresponding arc, ignoring its actual acoustic score, is compared with a best estimated score received from block 108. A benefit of not considering the actual acoustic score is that the method 100 does not need to calculate that score yet for each token. In some embodiments, the best estimated score is the best score in the previous frame. If the score of the generated token is significantly worse than the best estimated score by a threshold value, then it is discarded at circle 1-4a ("notify pruning"). In some embodiments, those scores higher than the best estimated score by a threshold value are discarded. Once a token is discarded, any arc that has yet to be processed for the current token from 1-1 is also discarded, since the arcs are sorted according to their weights. Those tokens which have yet to be processed get scores which are worse than the token that was discarded, and thus do not need to be considered. A benefit of such a system is that a potentially very large number of tokens can be discarded without having to compare them. This system may be especially beneficial for a large vocabulary recognition task as for such tasks there may be states with many outgoing arcs in the WFST. Furthermore, by comparing the token to a best estimated score instead of the actual best score of the tokens (which would require calculating the scores of all the tokens), the tokens which score poorly against the best estimated score do not need to be stored in the active token buffer and may be discarded beforehand.

In some embodiments, the estimated best score is the best score from the previous frame plus the best acoustic score of the current frame.

In some embodiments, the threshold value may be based on the weights of the arcs of the state being processed. In some embodiments, the threshold value may be based on the weights of the arcs of the state being processed, the best acoustic scores of the system, and/or the best score in the previous frame. In some embodiments, the threshold value may be based on time, complexity, and accuracy requirements for the speech recognizer. In some embodiments, the threshold value is a constant.

At circle 112 (a-n), those tokens that were not discarded will have their scores updated with their actual acoustic score, as received from block 110. In some embodiments, the tokens now have as their score the score of the token in the previous frame plus the weight of the arc plus the actual acoustic score. As described before, the acoustic score is the emission probability of the particular observation being considered during the frame. Once the scores of the tokens have been updated with the actual acoustic score, at circle 114 (a-n), the score of the tokens are once again compared to the best estimated score from block 108. Those tokens with updated actual acoustic scores that are significantly worse than the best estimated score by a threshold value are discarded. Note that the threshold value may not necessarily be the same as the threshold value used in circle 106 (a-n).

At circle 1-6 (a-n), the remaining tokens are placed in the active token buffer 116 for the next frame. In some embodiments, these remaining tokens are given the score of the original token (from the previous arc which arrived at that state to generate the current tokens), with the arc weight and the acoustic weight incorporated. The process described herein is then repeated until all utterances (speech audio) have been processed. At this point, the token with the best score is the one that includes the path hypothesis with the most likely text given the utterances.

In some embodiments, instead of sorting the WFST arcs by their weight, the arcs are clustered into groups depending on the arc weight. In some embodiments, the arcs are further clustered based on the acoustic properties of the destination states. During token processing, entire clusters are considered for discarding before considering the individual tokens. Furthermore, the first rejection mechanism may be based on the best acoustic score of the cluster compared to the best overall acoustic score rather than completely ignoring acoustic scores in that step. This may provide a better or more relevant estimate of the final score of the tokens. A potential advantage is that acoustic information may now be used for pruning the clusters.

In some embodiments, the method described above is implemented in a hardware decoder. This may facilitate speech recognition on smaller devices including smartphones, tablets and the internet of things.

Figure 2:
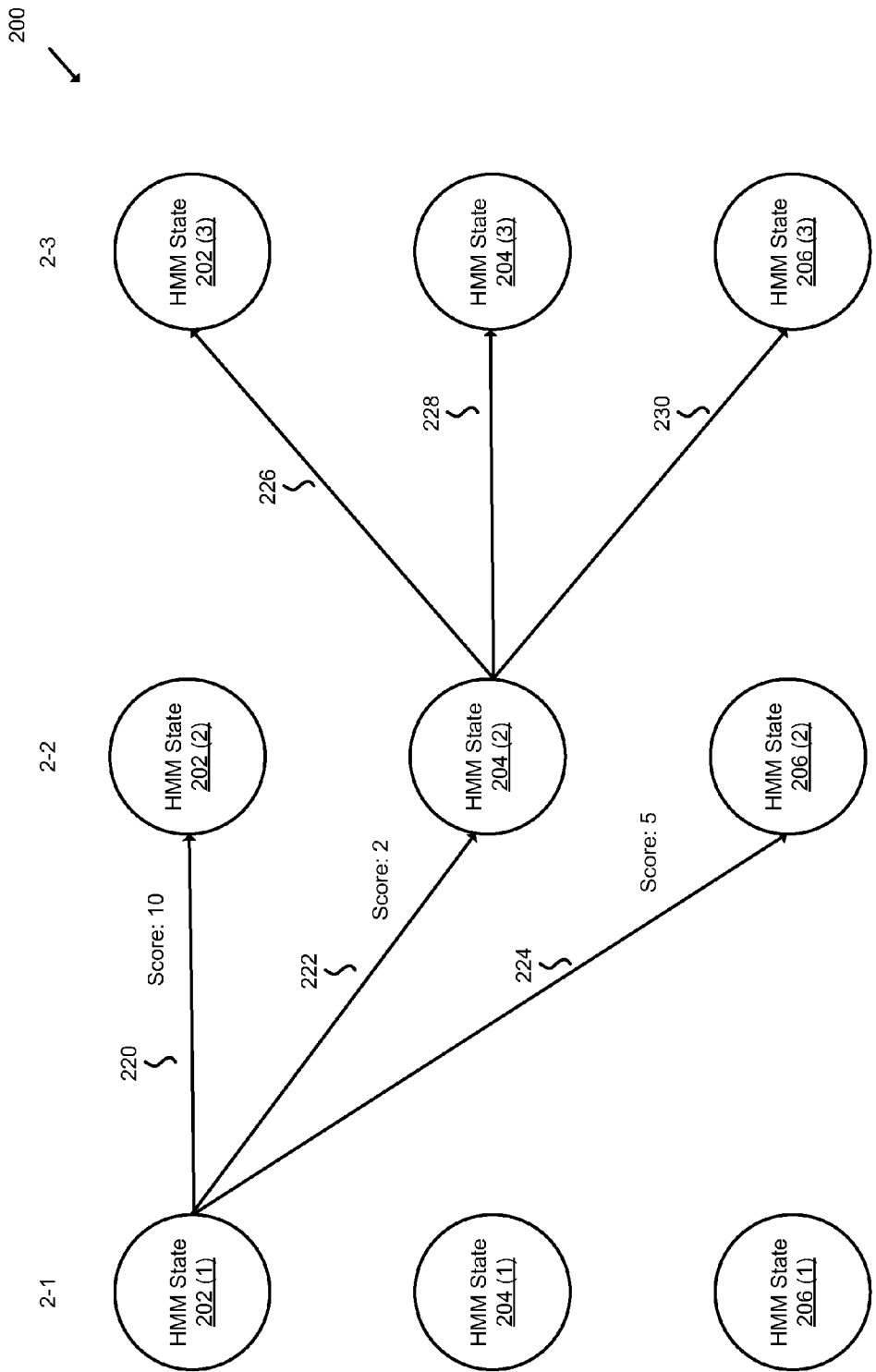
FIG. 2 is a trellis diagram 200 of an exemplary HMM which may be used by the method 100 in FIG. 1.

FIG. 2 is a trellis diagram 200 of an exemplary HMM which may be used by the method 100 in FIG. 1. The exemplary HMM includes three states, state 202, state 204, and state 206. The FSM for these three states includes arcs from each state to every other state. Thus, each state may transition to any other state in the FSM. The trellis 200 includes three frames (iterations), which are marked as 2-1, 2-2, and 2-3. These are not necessarily the beginning and ending frames for a decoding process. Although a realistic HMM for language would have a very large number of states with a large number of frames being processed, the trellis 200 is simplified for ease of understanding. At each frame marked in the trellis 200, the method 100 may determine the paths to take and the paths to discard.

At 2-1, the method 100 in the previous frame has already discarded the tokens leading to states 204 and 206 for that frame, as these tokens (and their corresponding paths) had scores that were worse than a best estimated score by some threshold. Thus, these tokens are no longer considered. Thus, only state 202 is considered at 2-1. Three tokens are generated for each arc 220, 222, and 224 from state 202 (1) to the new states 202 (2), 204 (2), and 206 (2) for the next frame. These tokens have scores of 10, 2, and 5, respectively with smaller scores being better. These scores do not include the actual acoustic scores for the tokens. As noted above with reference to FIG. 1, this score may be calculated in a variety of different ways. Also note that while the scores in this example are whole numbers, in practice the numbers are not likely to be whole numbers and may fall within a different range of values than the exemplary numbers shown. Assume that the score threshold based on the best estimated score is 3. As noted above with reference to FIG. 1, this best estimated score and the resulting score threshold may also be calculated in a variety of different ways.

Under such circumstances, applying the step in circle 104 in method 100, the tokens are implicitly sorted by their scores as the corresponding arcs are sorted by their weights. Then, applying the step in circle 106 in method 100, the token for arc 222 is processed, and its score of 2 is found to be less than the score threshold 3. Thus, it is preserved. The token with the next best score, the token for arc 224, is processed next and is found to have a score of 5 which is higher than the score threshold 3. At this point, according to the step in circle 1-4 in method 100, the token for arc 224 is discarded and any other tokens not yet processed are also discarded, namely, the token for arc 220.

The actual acoustic score for the remaining tokens is then updated and compared with the best estimated score, according to the steps at circles 112 and 114 in method 100. For the purposes of this example, assume that the token for arc 222 with its actual acoustic score remains at 2 and the score threshold for this processing step is still 3. Thus, this token for arc 222 is not dropped and is placed in the token buffer for the next frame.

At 2-2, the method 100 repeats with a new frame. The only token to survive the previous iteration of the method is the token for arc 222. The method 100 generates new tokens for arcs 226, 228, and 230 to all reachable states for the token for arc 222, and the process described above repeats to place tokens in the buffer for the next frame at 2-3. Since the tokens for arcs 224 and 220 were discarded, no arcs are generated for states 202 and 206 at frame 2-2.

Figure 3:
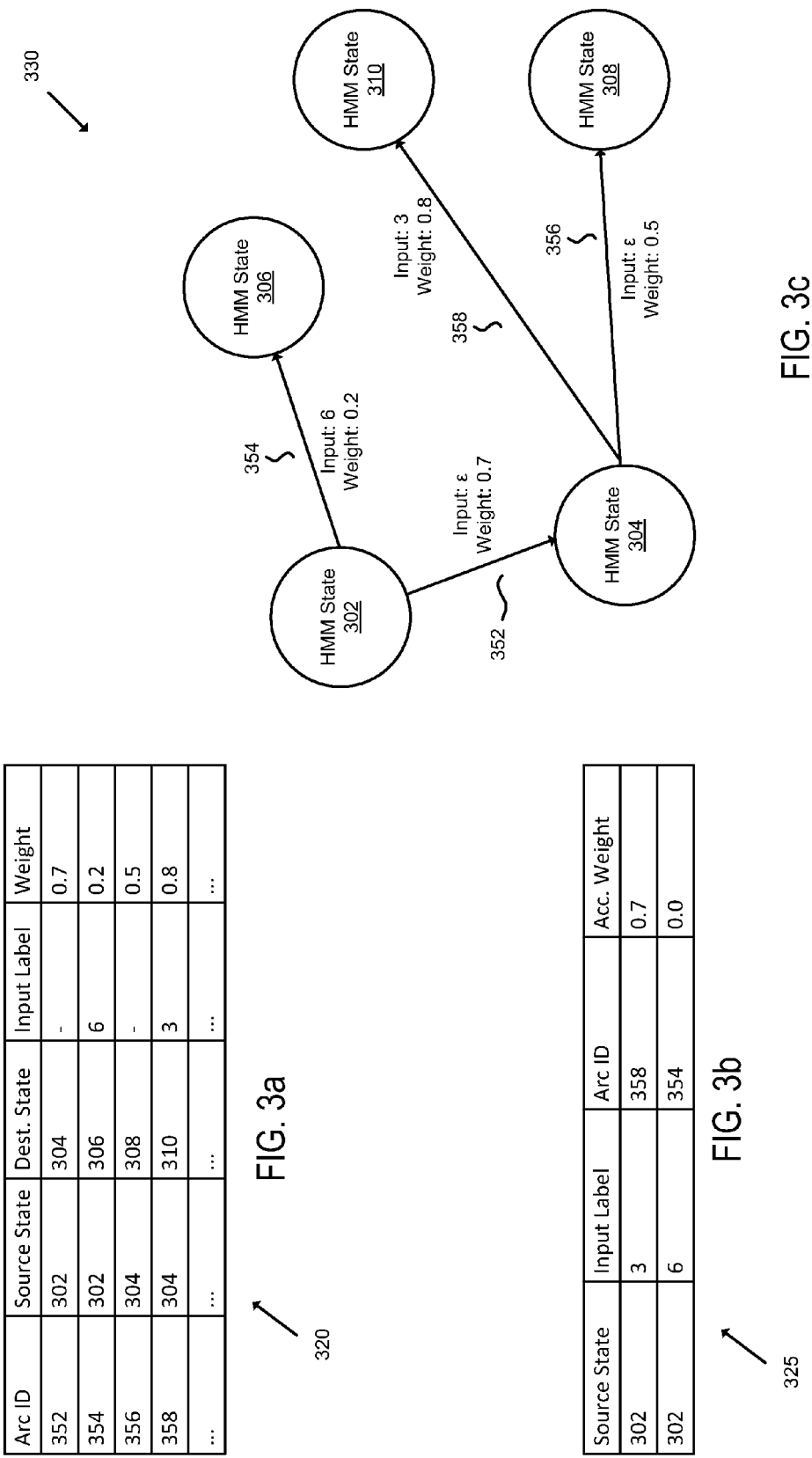
FIG. 3a illustrates a table 320 including a map of an exemplary WFST.
FIG. 3b illustrates a single lookup arc cache for arc caching optimizations to decoding of weighted finite state transducer (WFST) models for automatic speech recognition according to an embodiment of the invention.
FIG. 3c illustrates a WFST 330 corresponding to the same states and arcs in table 320.

FIGS. 3a and 3b illustrate an exemplary WFST according to an embodiment of the invention.

FIG. 3a illustrates a table 320 including a map of an exemplary acceptor WFST, i.e. a WFST where input and output labels are identical. The exemplary WFST mapped in table 320 is greatly simplified compared to a WFST for ASR for ease of understanding. The "Arc ID" column includes an identifier for an arc in the WFST. The "Source State" column indicates the source state for the arc identified in the "Arc ID" column. The "Dest. State" indicates the destination state of the same arc. The "Input Label" column indicates the input label for that arc. The decoding process will only follow an arc if the current input (which in some embodiments may represent a word generated from a lexicon WFST) matches the input label of the arc. If the input label is an epsilon, this is indicated by a hyphen. The decoder must follow every epsilon arc. The "Weight" column indicates the weight of the arc in the WFST.

FIG. 3b illustrates a single lookup arc cache for arc caching optimizations to decoding of weighted finite state transducer (WFST) models for automatic speech recognition according to an embodiment of the invention.

FIG. 3c illustrates a WFST 330 corresponding to the same states and arcs in table 320. Note that arc 352 and arc 356 have input labels of epsilon. Thus, for example, if state 304 is reached by the decoder, it must follow the epsilon arc 356 to state 308, but it only needs to follow the arc 358 to state 310 if the next input label is 3.

During speech recognition using dynamic composition, the WFST decoder finds arcs in the "right" WFST that have a given source state and input label, based on the output labels from the "left" WFST. This search is usually sped up by using an appropriate hardware or software cache. The arc cache maps (source state, input label) pairs to arcs in the right WFST. In speech recognition, the "right" WFST often contains a significant amount of epsilon arcs (e.g. arc 356). These arcs do not consume an input token and thus have to be followed instantly.

In dynamic composition caches, a search for a (state, input label) combination uses one cache lookup and one epsilon arc request per state that is recursively reachable by epsilon arcs, even if there are no cache misses. According to some embodiments, an improved cache only requires a single lookup. An advantage is that for typical statistical language models which use epsilon arcs to model backoff, the required number of cache and memory lookups during decoding can be significantly decreased.

In one embodiment, the improved cache is implemented using the arrangement of data from the table in FIG. 3b. According to some embodiments, unlike other caches, this single lookup arc cache in table 325 not only stores arcs that have the specified input label but also arcs that have input labels that are recursively reachable by epsilon transitions or arcs. In order for the WFST decoding to work correctly, the cache may also store the accumulated weight for reaching that arc with the desired input label (i.e., in the "Acc. Weight" column). Although this additional column would seem to require additional memory, the single lookup cache no longer needs to store non-existing arcs (e.g. epsilon arcs). Thus, the single lookup cache not only saves space but also improves efficiency.

Referring to the arc cache in table 325, as an example, if a token includes a request for an arc with a source state of 302 and input label "3", the arc cache returns that arc 358 has input label "3" and is reachable by epsilon arcs from state 302, requiring a total weight of 0.7. Referring to table 320 and FSM 330, no arc has an input label of "3" at state 302. Thus, a traditional arc cache would not return a result for a lookup of state 302 and input label "3". Instead, with a traditional arc cache, the decoder would need to follow the epsilon arc paths and perform new lookups at each state it reaches until the traditional arc cache returns an arc that accepts the input label.

According to some embodiments, if there is a cache miss, the cache controller, in addition to searching for the arc in the source state, also recursively searches in all epsilon-reachable states. The overall complexity of the algorithm is not influenced by this increase in the complexity of the cache controller, as in a decoder without this type of single lookup arc cache, there would be several cache misses in this case and the recursive nature of epsilon arcs would have to be handled in the decoder. In fact, since the decoder would encounter this cache miss problem each time this epsilon arc scenario occurred, it would have to follow the epsilon arcs multiple times, instead of having the cache controller only follow it a single time.

In some embodiments, the "left" WFST is a statically composed WFST including the acoustic model (acoustic features to phones) and lexicon model (phones to words), while the "right" WFST is the language model (words to a sentence/string of words).

Figure 4:
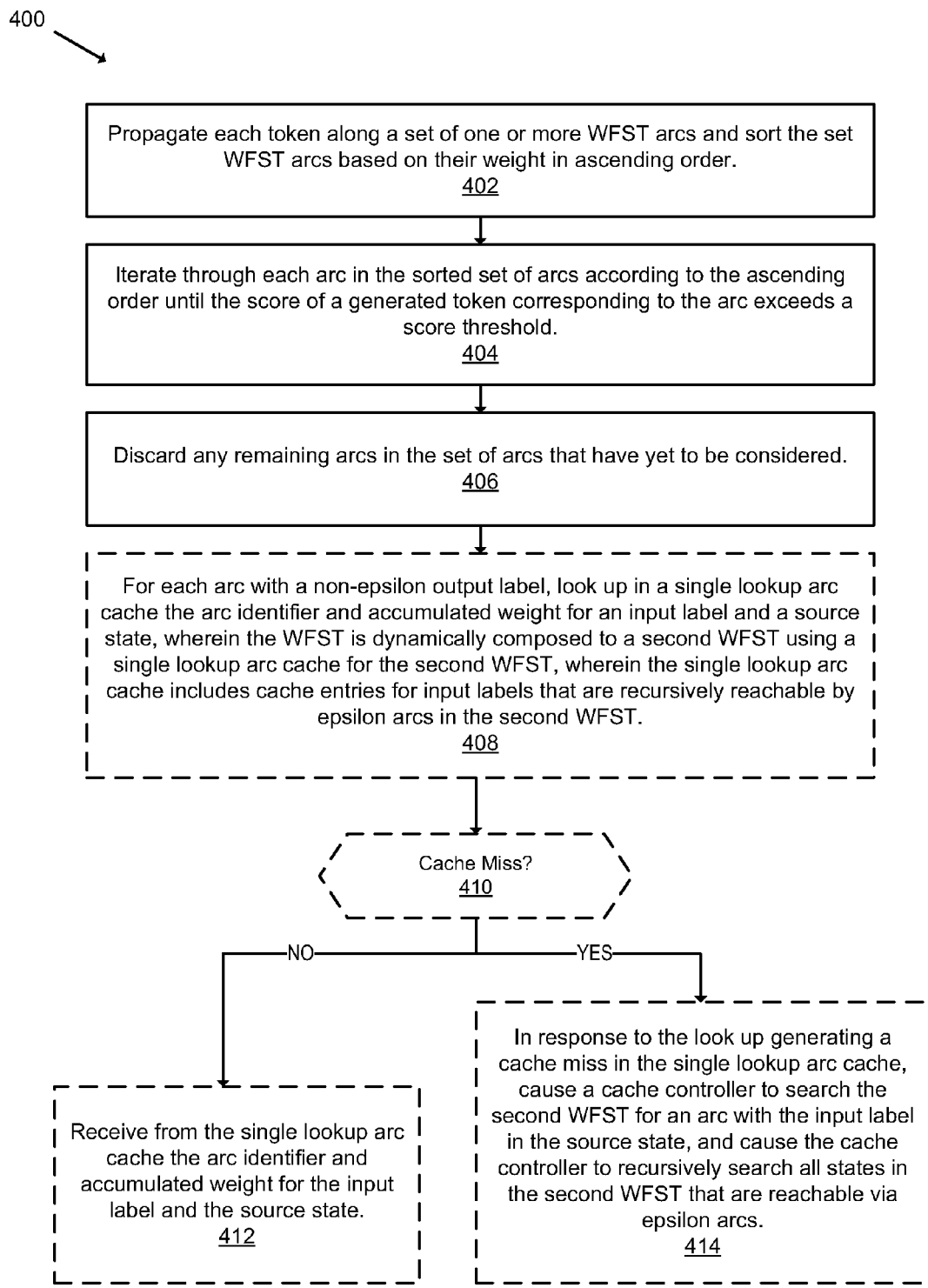
FIG. 4 is a flow diagram illustrating a method 500 in a computing device for weighted finite state transducer (WFST) speech recognition according to an embodiment of the invention.

FIG. 4 is a flow diagram illustrating a method 400 in a computing device for weighted finite state transducer (WFST) speech recognition according to an embodiment of the invention. In some embodiments, this method is performed by computing device. In some embodiments, this method is performed by processor 568 having a WFST decoder as described with reference to FIG. 5.

At 402, the computing device propagates each token along a set of WFST arcs which are sorted by their weight in ascending order. At 404, the computing device iterates through each arc in the sorted set of arcs according to the ascending order until the score of the generated token exceeds a certain score threshold. At 406, the computing device discards any remaining arcs in the set of arcs that have yet to be considered.

In some embodiments, the score of each token is the sum of a cumulative score of that token from the previous frame, the weight of the corresponding arc, and the best acoustic score of the current frame.

In some embodiments, the score threshold is the sum of the best score from the previous frame, the best acoustic score of the current frame and a predefined constant.

In some embodiments, for each remaining token, the computing device calculates the actual acoustic score for the token, discards the tokens with a modified score exceeding another score threshold, wherein the modified score is a sum of a cumulative score of that token from the previous frame, the weight of the corresponding arc, and the acoustic score of the current frame, and places any tokens that have not been discarded in an active token buffer for the next frame.

In some embodiments, the set of arcs is one clustered set of arcs out of a plurality of clustered sets of arcs, and wherein the best acoustic score of the clustered set of arcs is used for computing the score threshold.

In some embodiments, at 408, the computing device, for each arc with a non-epsilon output label, look ups in a single lookup arc cache the arc identifier and accumulated weight for an input label and a source state, wherein the WFST is dynamically composed to a second WFST using a single lookup arc cache for the second WFST, wherein the single lookup arc cache includes cache entries for input labels that are recursively reachable by epsilon arcs in the second WFST.

In some embodiments, each entry in the single lookup arc cache includes a source state identifier, an input label identifier, an arc identifier, and an accumulated weight value, wherein the accumulated weight value corresponds to the weight of the arcs along the path from the state identified by the source state identifier to the arc identified by the arc identifier.

In some embodiments, at 410, the computing device determines if the lookup in 408 resulted in a miss. If so, in some embodiments, flow passes to 412; otherwise, flow passes to 414.

In some embodiments, at 412, the computing device receives from the single lookup arc cache the arc identifier and accumulated weight for the input label and the source state In some embodiments, at 414, the computing device, in response to the look up generating a cache miss in the single lookup arc cache, causes a cache controller to search the second WFST for an arc with the input label in the source state, and also causes the cache controller to recursively search all states in the second WFST that are reachable via epsilon arcs, in order to populate the single lookup arc cache with the missed entry.

Although the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Figure 5:
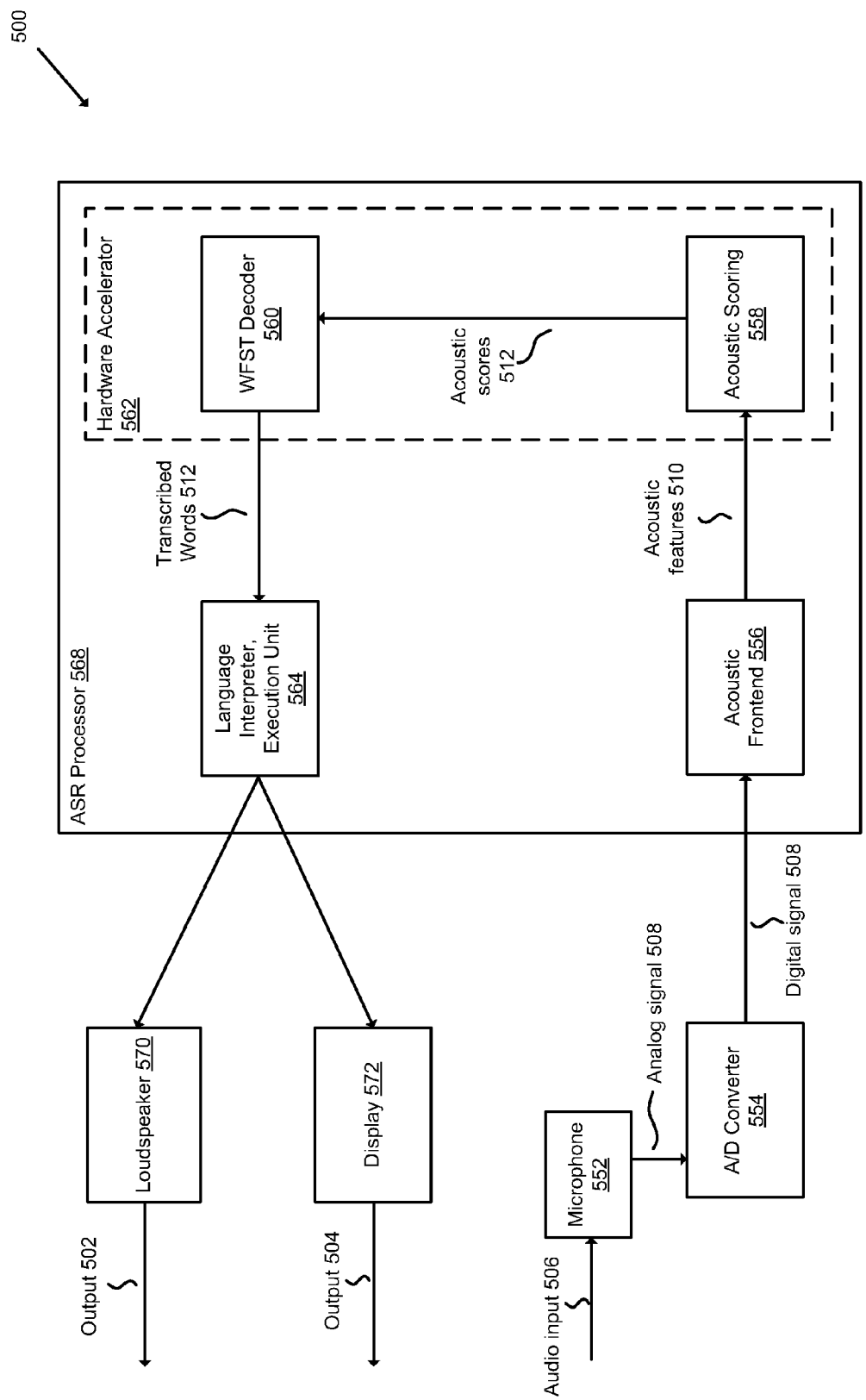
FIG. 5 illustrates a block diagram for an exemplary ASR system 500 that may be used in some embodiments.

FIG. 5 illustrates a block diagram for an exemplary ASR system 500 that may be used in some embodiments. In an ASR system, speech enabled human machine interfaces (HMI) record audio with a microphone, process the acoustic data with a computer and then output speech or visual information to the user.

Referring to FIG. 5, in some embodiments, audio input 506 is received by the microphone 552. Audio input 506 may be live speech from a human or a previous recording. Microphone 552 may be any type of recording instrument, such as a condenser microphone, dynamic microphone, ribbon microphone, etc., and may be directional or not directional. In other embodiments, the system picks up the audio input directly from a recording without the user of a microphone. In the cases where the audio input 506 is analog, an analog/digital (A/D) converter 554 is utilized to convert the audio signal into a digital signal, such as pulse-code modulation (PCM) uncompressed audio.

The digital signal 508 is then sent to the ASR processor 568. The ASR processor 568 may be a general purpose computing device, such as a laptop or desktop computer, mobile phone, wearable device, etc., that is able to execute other applications and functions, or it may be specialized software for ASR, and include special hardware components, such as specialized cache device for dynamic composition, a hardware decoder, etc.

The digital signal 508 is fed to the acoustic frontend 556, which converts the digital signal 508 to acoustic features 510. In some embodiments, the digital signal is segmented into small sections of audio using a window function, such as the Hamming window function. These small frames are then typically converted into frequency or cepstral domain, for example in the format of mel-frequency cepstral coefficient vectors, which represent the power spectrum of the digital audio 508 sound. A mel scale is a subjectively perceived non-linear scale of the audible spectrum.

These audio features 510 are then sent to acoustic scoring 558 to determine the acoustic scores 512 for the audio features 510. In some embodiments, the acoustic scores are the emission probabilities of the observed audio features 510. In some embodiments, the acoustic scores 512 are those from block 110 in method 100.

These acoustic scores 512 are then sent to the WFST decoder 560, at which point the WFST model is traversed in order to determine the most likely text, or transcribed words 512, for the audio. The optimizations described above, such as the method 100 for beam pruning described with reference to FIGS. 1 and 2, and the arc cache described with reference to FIGS. 3a-c, may be used in the WFST decoder 560 to improve the speed of the decoding process and reduce the computational complexity.

In some embodiments, the acoustic scoring 558 process and the WFST decoder 560 are part of a hardware accelerator 562 that implements the acoustic scoring 558 and WFST decoder 560 in full or partial hardware. This hardware may include specialized ASICs or coprocessors optimized for scoring and decoding tasks such as floating point operations, parallel search, fast caching, etc.

In some embodiments, the transcribed words 512 are then sent to the language interpreter and execution unit 564 which sends the transcribed words to a loudspeaker 570 for audio output 502 or to a display 572 for visual output 504.

While the ASR system above has been described in terms of several embodiments and hardware and/or software components, the methods and apparatuses described above are not limited to be implemented on those hardware and/or software components described with reference to FIG. 5, and may be implemented in other embodiments as well.

Figure 6:
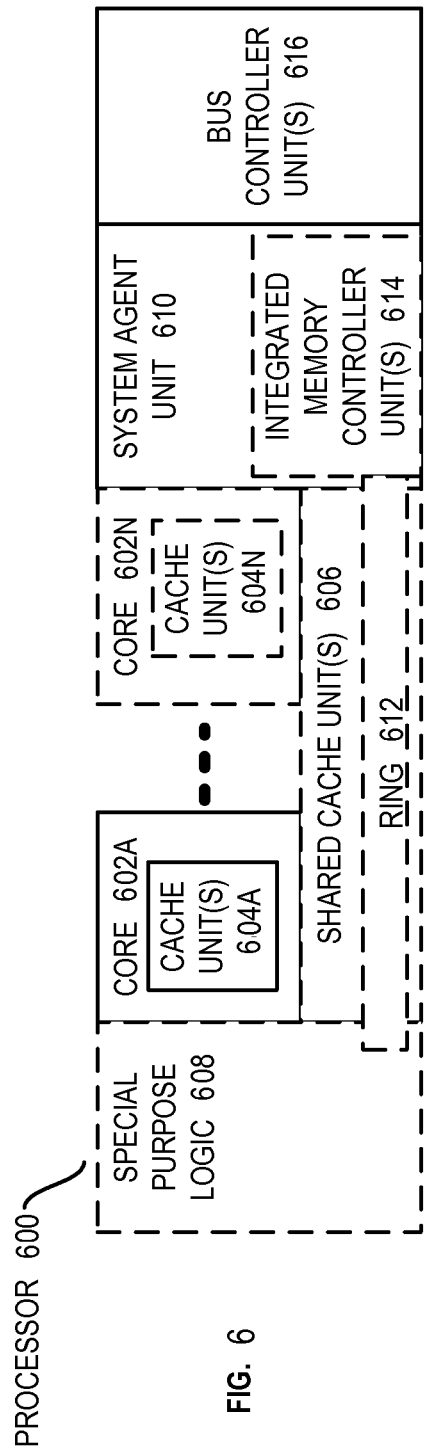
FIG. 6 is a block diagram of a processor that may have more than one core, may have an integrated memory controller, and may have integrated graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608. In some embodiments, this processor 600 is configured to implement the methods described above.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Figure 7:
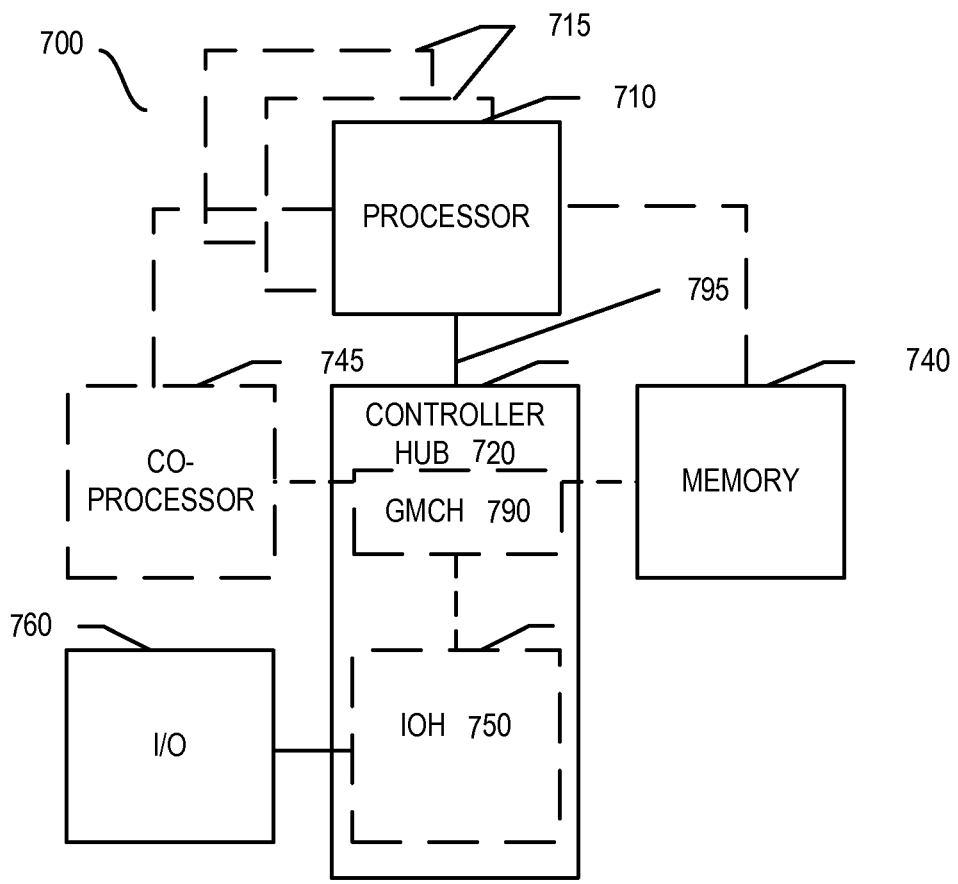
FIGS. 7-10 are block diagrams of exemplary computer architectures.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
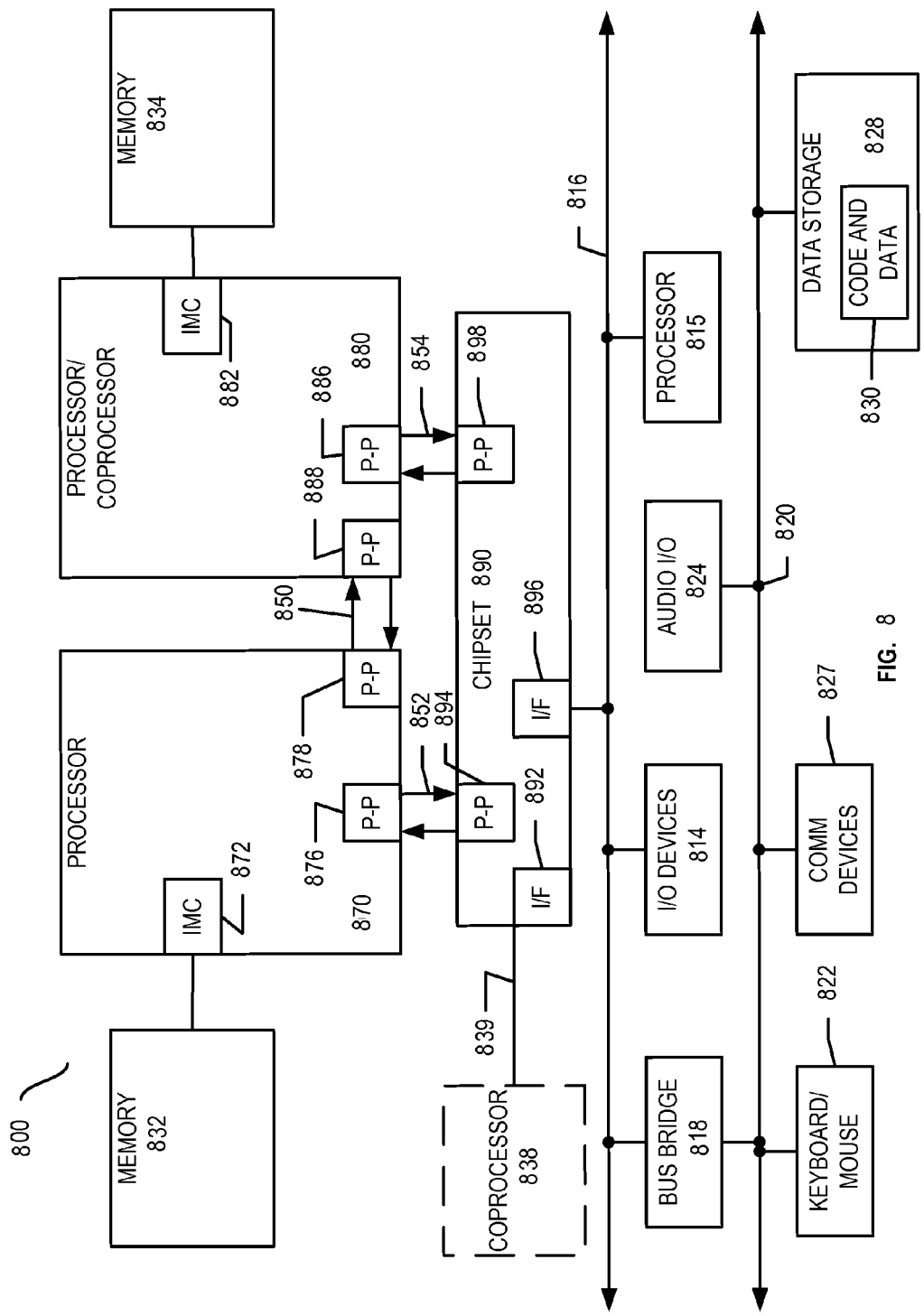

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
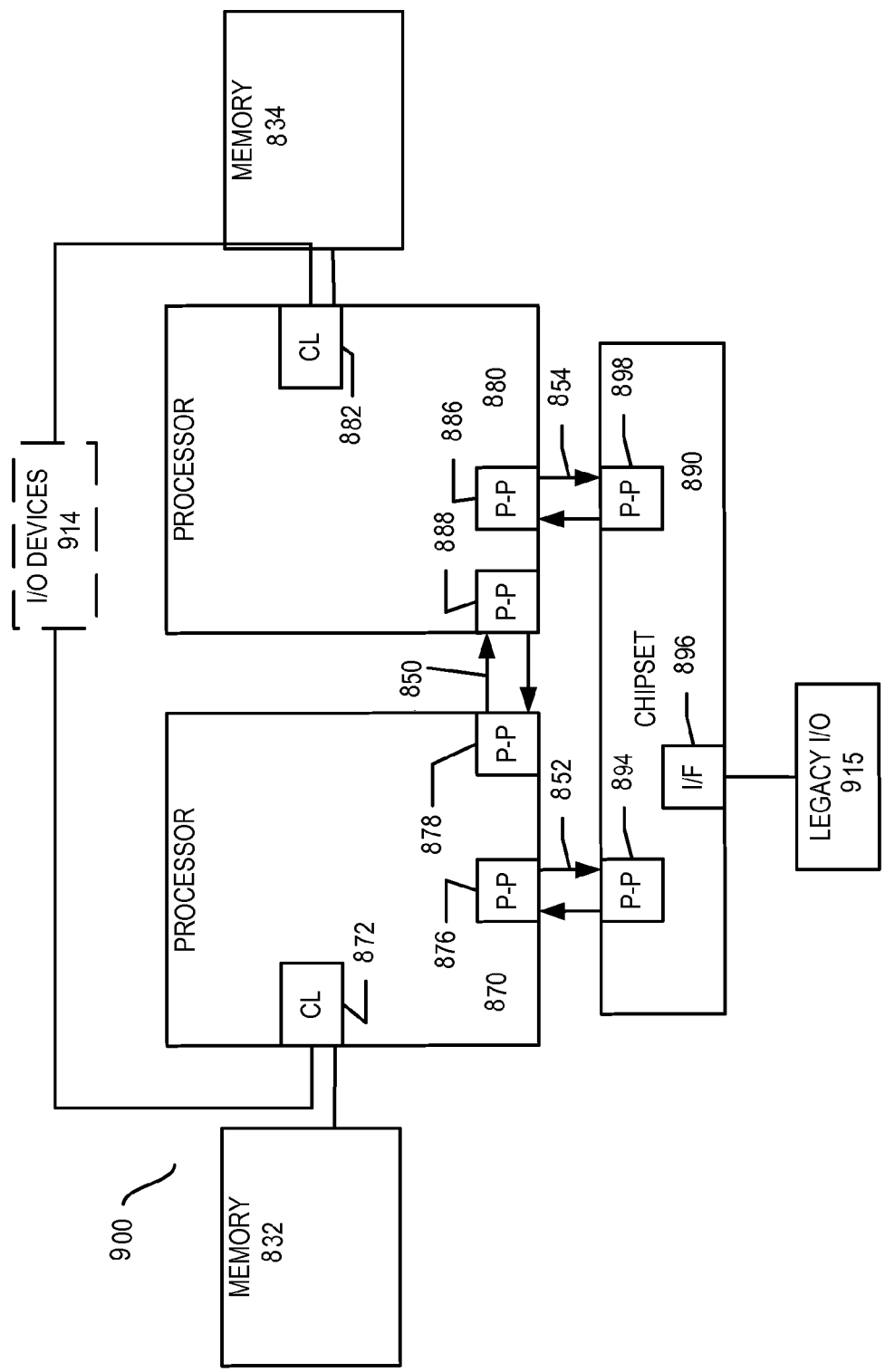

Referring now to FIG. 9, shown is a block diagram of a second more specific exemplary system 900 in accordance with an embodiment of the present invention. Like elements in FIGS. 40 and 41 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
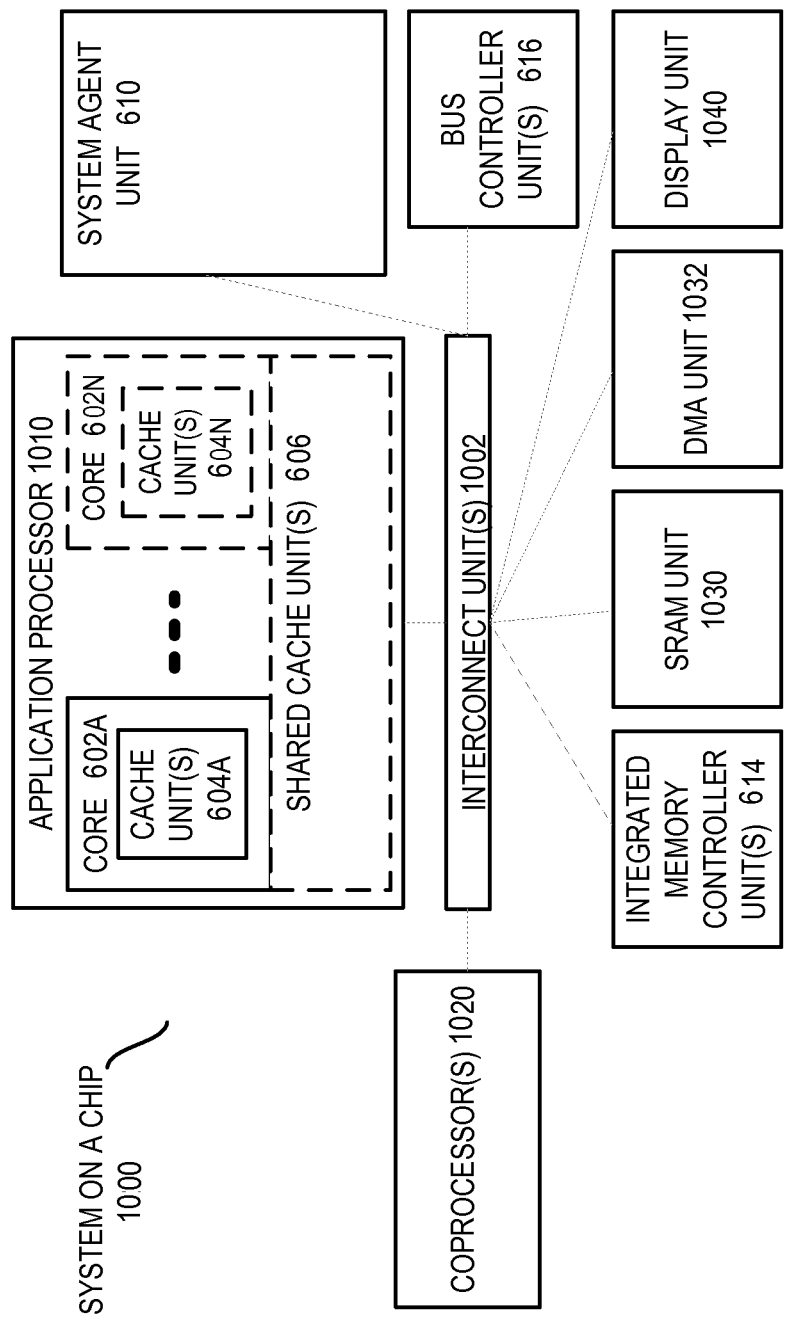

Referring now to FIG. 10, shown is a block diagram of a SoC 1000 in accordance with an embodiment of the present invention. Similar elements in FIG. 38 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

An embodiment of the invention includes a method for performing weighted finite state transducer (WFST) speech recognition, comprising sorting a set of one or more WFST arcs based on their weight in ascending order, iterating through each arc in the sorted set of arcs according to the ascending order until the score of a generated token corresponding to the arc exceeds a score threshold; and discarding any remaining arcs in the set of arcs that have yet to be considered.

An additional embodiment includes, wherein the score of each token is the sum of a cumulative score of that token from the previous frame, the weight of the corresponding arc, and the best acoustic score of the current frame. An additional embodiment includes, wherein the score threshold is the sum of the best score from the previous frame, the best acoustic score of the current frame and a predefined constant.

An additional embodiment includes, for each remaining token, calculating the actual acoustic score for the token; discarding the tokens with a modified score exceeding another score threshold, wherein the modified score is a sum of a cumulative score of that token from the previous frame, the weight of the corresponding arc, and the acoustic score of the current frame, and placing any tokens that have not been discarded in an active token buffer for the next frame.

An additional embodiment includes, wherein the set of arcs is one clustered set of arcs of a plurality of clustered sets of tokens, and wherein the best acoustic score of the clustered set of arcs is used for computing the score threshold.

An additional embodiment includes, wherein the WFST is dynamically composed to a second WFST using a single lookup arc cache for the second WFST, wherein the single lookup arc cache includes cache entries for input labels that are recursively reachable by epsilon arcs in the second WFST.

An additional embodiment includes, wherein each entry in the single lookup arc cache includes a source state identifier, an input label identifier, an arc identifier, and an accumulated weight value, wherein the accumulated weight value corresponds to the weight of the arcs along the path from the state identified by the source state identifier to the arc identified by the arc identifier.

An additional embodiment includes looking up in the single lookup arc cache the arc identifier and accumulated weight for an input label and a source state, and receiving from the single lookup arc cache the arc identifier and accumulated weight for the input label and the source state.

An additional embodiment includes looking up in the single lookup arc cache the arc identifier and accumulated weight for an input label and a source state, wherein the single lookup arc cache does not include an entry corresponding to the input label and the source state, and in response to the look up, generating a cache miss in the single lookup arc cache, causing a cache controller to search the second WFST for an arc with the input label in the source state, and causing the cache controller to recursively search all states in the second WFST that are reachable via epsilon arcs, in order to populate the single lookup arc cache with the missed entry.

An embodiment of the invention includes An apparatus for weighted finite state transducer (WFST) speech recognition, comprising an acoustic frontend configured to receive a digital audio signal representing human speech from an analog/digital converter and convert the digital audio signal into a set of one or more acoustic features, a memory to store a trained WFST model for speech recognition, a WFST decoder to use token passing to decode the acoustic features into transcribed words based on the WFST model, the WFST decoder to execute instructions to sort a set of one or more WFST arcs based on their arc weight in ascending order, iterate through each arc in the sorted set of arcs according to the ascending order until the score of the generated token corresponding to the arc exceeds a score threshold, and discard any remaining arcs in the set of arcs that have yet to be considered, and a language interpreter execution unit to output the transcribed words to at least one of a sound output and a visual output.

An additional embodiment includes, wherein the score of each token is the sum of a cumulative score of that token from the previous frame, the weight of the corresponding arc, and the best acoustic score of the current frame.

An additional embodiment includes, wherein the score threshold is the sum of the best score from the previous frame, the best acoustic score of the current frame and a predefined constant.

An additional embodiment includes, wherein the WFST decoder further executes instructions to for each remaining token, calculate the actual acoustic score for the token, discard the tokens with a modified score exceeding another score threshold, wherein the modified score is a sum of a cumulative score of that token from the previous frame, the weight of the corresponding arc, and the acoustic score of the current frame, and place any tokens that have not been discarded in an active token buffer for the next frame.

An additional embodiment includes, wherein the set of arcs is one clustered set of arcs out of a plurality of clustered sets of arcs, and wherein the best acoustic score of the clustered set of arcs is used to compute the score threshold.

An additional embodiment includes, wherein the WFST is dynamically composed to a second WFST using a single lookup arc cache for the second WFST, wherein the single lookup arc cache includes cache entries for input labels that are recursively reachable by epsilon arcs in the second WFST.

An additional embodiment includes, wherein each entry in the single lookup arc cache includes a source state identifier, an input label identifier, an arc identifier, and an accumulated weight value, wherein the accumulated weight value corresponds to the weight of the arcs along the path from the state identified by the source state identifier to the arc identified by the arc identifier.

An additional embodiment includes, wherein the WFST decoder further executes instructions to look up in the single lookup arc cache the arc identifier and accumulated weight for an input label and a source state, and receive from the single lookup arc cache the arc identifier and accumulated weight for the input label and the source state.

An additional embodiment includes, wherein the WFST decoder further executes instructions to look up in the single lookup arc cache the arc identifier and accumulated weight for an input label and a source state, wherein the single lookup arc cache does not include an entry corresponding to the input label and the source state, and in response to the look up, generate a cache miss in the single lookup arc cache, to cause a cache controller to search the second WFST for an arc with the input label in the source state, and to cause the cache controller to recursively search all states in the second WFST that are reachable via epsilon arcs, in order to populate the single lookup arc cache with the missed entry.

An embodiment includes a non-transitory computer-readable storage medium having instructions stored therein, wherein the instructions, when executed by a processor of a client device, causes the processor to perform operations for weighted finite state transducer (WFST) speech recognition, the operations comprising sorting a set of one or more arcs based on their arc weight in ascending order, iterating through each arc in the sorted set of arcs according to the ascending order until the score of the generated token corresponding to the arc exceeds a score threshold, and discarding any remaining arcs in the set of arcs that have yet to be considered.

An additional embodiment includes, wherein the score of each token is the sum of a cumulative score of that token from the previous frame, the weight of the corresponding arc, and the best acoustic score of the current frame.

An additional embodiment includes, wherein the score threshold is the sum of the best score from the previous frame, the best acoustic score of the current frame and a predefined constant.

An additional embodiment includes, the operations further comprising for each remaining token, calculating the actual acoustic score for the token, discarding the tokens with a modified score exceeding another score threshold, wherein the modified score is a sum of a cumulative score of that token from the previous frame, the weight of the corresponding arc, and the acoustic score of the current frame, and placing any tokens that have not been discarded in an active token buffer for the next frame.

An additional embodiment includes, wherein the set of arcs is one clustered set of arcs out of a plurality of clustered sets of arcs, and wherein the best acoustic score of the clustered set of arcs is used to compute the score threshold.

An additional embodiment includes, wherein the WFST is dynamically composed to a second WFST using a single lookup arc cache for the second WFST, wherein the single lookup arc cache includes cache entries for input labels that are recursively reachable by epsilon arcs in the second WFST.

An additional embodiment includes, wherein each entry in the single lookup arc cache includes a source state identifier, an input label identifier, an arc identifier, and an accumulated weight value, wherein the accumulated weight value corresponds to the weight of the arcs along the path from the state identified by the source state identifier to the arc identified by the arc identifier.

An additional embodiment includes, the operations further comprising looking up in the single lookup arc cache the arc identifier and accumulated weight for an input label and a source state, receiving from the single lookup arc cache the arc identifier and accumulated weight for the input label and the source state.

An additional embodiment includes, the operations further comprising looking up in the single lookup arc cache the arc identifier and accumulated weight for an input label and a source state, wherein the single lookup arc cache does not include an entry corresponding to the input label and the source state, and in response to the look up, generating a cache miss in the single lookup arc cache, causing a cache controller to search the second WFST for an arc with the input label in the source state, and causing the cache controller to recursively search all states in the second WFST that are reachable via epsilon arcs, in order to populate the single lookup arc cache with the missed entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus for weighted finite state transducer (WFST) speech recognition, comprising:
    an acoustic frontend configured to receive a digital audio signal representing human speech from an analog/digital converter and convert the digital audio signal into a set of one or more acoustic features;
    a memory to store a trained WFST model for speech recognition;
    a WFST decoder to use token passing to decode the acoustic features into transcribed words based on the WFST model, the WFST decoder to execute instructions to:
        sort a set of one or more WFST arcs based on their arc weight in ascending order;
        iterate through each arc in the sorted set of arcs according to the ascending order until the score of the generated token corresponding to the arc exceeds a score threshold; and
        discard any remaining arcs in the set of arcs that have yet to be considered; and
    a language interpreter execution unit to output the transcribed words to at least one of a sound output and a visual output.

2. The apparatus of claim 1, wherein the score of each token is the sum of a cumulative score of that token from the previous frame, the weight of the corresponding arc, and the best acoustic score of the current frame.

3. The apparatus of claim 2, wherein the score threshold is the sum of the best score from the previous frame, the best acoustic score of the current frame and a predefined constant.

4. The apparatus of claim 3, wherein the WFST decoder further executes instructions to:

for each remaining token, calculate the actual acoustic score for the token;
    discard the tokens with a modified score exceeding another score threshold, wherein the modified score is a sum of a cumulative score of that token from the previous frame, the weight of the corresponding arc, and the acoustic score of the current frame; and
    place any tokens that have not been discarded in an active token buffer for the next frame.

5. The apparatus of claim 1, wherein the WFST is dynamically composed to a second WFST using a single lookup arc cache for the second WFST, wherein the single lookup arc cache includes cache entries for input labels that are recursively reachable by epsilon arcs in the second WFST.

6. The apparatus of claim 5, wherein each entry in the single lookup arc cache includes a source state identifier, an input label identifier, an arc identifier, and an accumulated weight value, wherein the accumulated weight value corresponds to the weight of the arcs along the path from the state identified by the source state identifier to the arc identified by the arc identifier.

7. The apparatus of claim 6, wherein the WFST decoder further executes instructions to:
    look up in the single lookup arc cache the arc identifier and accumulated weight for an input label and a source state; and
    receive from the single lookup arc cache the arc identifier and accumulated weight for the input label and the source state.

8. The apparatus of claim 6, wherein the WFST decoder further executes instructions to:
    look up in the single lookup arc cache the arc identifier and accumulated weight for an input label and a source state, wherein the single lookup arc cache does not include an entry corresponding to the input label and the source state; and
    in response to the look up, generate a cache miss in the single lookup arc cache, to cause a cache controller to search the second WFST for an arc with the input label in the source state, and to cause the cache controller to recursively search all states in the second WFST that are reachable via epsilon arcs, in order to populate the single lookup arc cache with the missed entry.

* * * * *